United States Patent
Slonecker, Jr.

(10) Patent No.: US 7,383,988 B2
(45) Date of Patent: Jun. 10, 2008

(54) SYSTEM AND METHOD FOR LOCKING AND UNLOCKING A FINANCIAL ACCOUNT CARD

(75) Inventor: David B. Slonecker, Jr., Rosendale, WI (US)

(73) Assignee: Metavante Corporation, Milwaukee, WI (US)

( * ) Notice: Subject to any disclaimer, the term of this patent is extended or adjusted under 35 U.S.C. 154(b) by 248 days.

(21) Appl. No.: 11/217,018

(22) Filed: Aug. 31, 2005

(65) Prior Publication Data

US 2007/0045403 A1 Mar. 1, 2007

(51) Int. Cl.
*G06K 5/00* (2006.01)
(52) U.S. Cl. ...................... 235/380; 235/492
(58) Field of Classification Search ............ 235/380, 235/379, 382, 492; 705/41, 40, 44
See application file for complete search history.

(56) References Cited

U.S. PATENT DOCUMENTS

| | | | | |
|---|---|---|---|---|
| 5,661,285 A | * | 8/1997 | Elrick et al. | 235/380 |
| 5,777,305 A | | 7/1998 | Smith et al. | |
| 5,811,771 A | * | 9/1998 | Dethloff | 235/380 |
| 5,936,221 A | | 8/1999 | Corder et al. | |
| 6,052,675 A | | 4/2000 | Checchio | |
| 6,070,794 A | * | 6/2000 | Niwata et al. | 235/380 |
| 6,188,309 B1 | | 2/2001 | Levine | |
| 6,273,334 B1 | * | 8/2001 | Ijichi et al. | 235/380 |
| 6,273,335 B1 | * | 8/2001 | Sloan | 235/382 |
| 6,339,766 B1 | | 1/2002 | Gephart | |
| 6,431,443 B1 | * | 8/2002 | Barnes et al. | 235/380 |
| 6,473,500 B1 | | 10/2002 | Risafi et al. | |
| 2003/0187788 A1 | * | 10/2003 | Rothfarb | 705/40 |
| 2003/0190955 A1 | * | 10/2003 | Weiss | 463/36 |
| 2003/0217001 A1 | | 11/2003 | McQuaide, Jr. et al. | |
| 2004/0249503 A1 | * | 12/2004 | Sanchez | 700/237 |
| 2005/0010483 A1 | | 1/2005 | Ling | |
| 2005/0051619 A1 | | 3/2005 | Graves et al. | |
| 2006/0058064 A1 | * | 3/2006 | Satou | 455/558 |

FOREIGN PATENT DOCUMENTS

| | | |
|---|---|---|
| JP | 3078871 | 4/1991 |
| JP | 4088555 | 3/1992 |
| JP | 2002150192 | 5/2002 |
| WO | WO-2004/114698 | 12/2004 |

* cited by examiner

*Primary Examiner*—Thien M Le
(74) *Attorney, Agent, or Firm*—Reinhart Boerner Van Deuren S.C.

(57) ABSTRACT

A system and method whereby a holder of a financial account card, such as a credit card or debit card, is able to disable and re-enable use of the card by locking and unlocking the card repeatedly. A request to lock or unlock a card may be provided by a variety of delivery channels, e.g., telephone, automated teller machine, or online, to a card processor. For a locking transaction the card processor saves the current operable status of the card and changes the status to locked. For an unlocking transaction the saved operable status of the card is restored. The changed locked or unlocked status of the card is reported by the card processor to companion systems and an audit record created.

25 Claims, 5 Drawing Sheets

SYSTEM AND METHOD FOR LOCKING AND UNLOCKING A FINANCIAL ACCOUNT CARD

FIELD OF THE INVENTION

The present invention pertains generally to financial accounts, such as credit and deposit accounts, and to computer based systems and methods for managing such accounts and, more particularly, to computer implemented systems and methods for managing financial accounts that are accessed by the owners thereof using a card, such as a credit card or a debit card, and to systems and methods for activating and deactivating such cards.

BACKGROUND OF THE INVENTION

Individuals and businesses typically may hold a variety of financial accounts with a variety of different entities. For example, such financial accounts may include credit accounts, such as credit card accounts, and deposit accounts, such as savings and checking accounts, and the like. Such accounts may be maintained by the owners thereof with a variety of financial institutions, such as banks, savings and loans, credit unions, and other banking entities, as well as with brokerage firms, retail establishments, and the like. The owners of such accounts often may be able to access the accounts via the use of a card, such as a credit card, for accessing a credit account, or a debit card, for accessing a deposit account, such as a savings or checking account. Such cards may be used by the account owner, e.g., to make purchases, by physically presenting the card at a point of purchase. For some transactions, such as mail orders, telephone orders, or orders made over the Internet, the card does not have to be physically present. For such transactions, the credit card number, which typically is physically printed on the card as well as electronically encoded in a magnetic strip on the card that may be read by an appropriate card reader, may be provided to a merchant via mail, over the telephone, and/or via a computer network, e.g., the Internet.

No matter how the card or card number is presented, the processing of a transaction using the card number typically is performed electronically. The card number is provided electronically to a card processing system, which may or may not be operated by the financial institution or other entity that holds the account being accessed. The card processing system verifies that the card number corresponds to an active account, that the card itself is valid for accessing the account, that account limits have not been exceeded, etc. If the pre-established conditions for accessing the account using the card are satisfied, electronic approval is provided by the processing system to indicate that the card transaction may proceed.

A variety of security measures may be employed to ensure that a card used for accessing an underlying financial account is used only by the account owner or someone authorized by the account owner. For example, for some card transactions, such as a cash withdrawal or draw on the account from an automatic teller machine (ATM), or at some retail outlets, the individual presenting the card will be required to provide a personal identification number (PIN) that is not printed or otherwise provided on the card itself. An individual presenting a card for a transaction may be required to provide a signature on the transaction receipt. This signature is compared to a signature on the card by a person conducting the transaction to verify that the card owner and person presenting the card are the same individual. Some credit cards and debit cards may have a photograph of the card owner thereon, which also can be used to verify that the person presenting the card is the card owner. Some credit card transactions, particularly credit card transactions performed online over the internet, may require the card user to provide a card verification value (CVV) or card verification code (CVC) as an additional security measure. The CVV/CVC are numeric codes constructed by a cryptographic process based on card data, such as the card number, the expiration date, etc., that are written to the magnetic stripe of the card as well as printed on the back of the card. Merchants and others who accept credit cards, debit cards, and the like for payment employ these and other methods to prevent use of such cards by those who are not authorized to do so.

Despite the security measures mentioned above, when a financial account card, such as a credit card or debit card, is lost or stolen there is still significant risk that the card may be used and, therefore, the underlying financial account accessed, by an unauthorized person. Thus, financial account card issuers strongly recommend that, if a card is lost, stolen, or otherwise misplaced, the card owner immediately contact the card issuer. Card issuers conveniently provide a toll-free customer service telephone number that may be called at any time by a card holder in the event that a card is lost, stolen, or misplaced. Upon calling the customer service number the card owner will be asked to provide the card number or account number for the card that was lost or stolen or misplaced. This number will be entered into the card processing system electronically, and the card will automatically be cancelled or disabled. That is, no further transactions using the cancelled card number will be allowed by the card processing system. If any attempt is made to use the card number or a card bearing the card number after the card is cancelled in this manner, the card processing system will reject the transaction, providing an indication that the card is no longer valid or has been cancelled. Typically, upon canceling a financial account card in this manner, the credit card processing system will automatically initiate a process to issue to the card owner a new replacement card bearing a new card number, such that the card owner may be able to access the underlying financial account using the new card number.

A misplaced credit or debit card can cause a card owner considerable anxiety. A missing card may be in the hands of someone who may try to use the card or card number to access the owner's financial accounts. Thus, it is quite reasonable to want to cancel a financial account card as soon as it turns up missing. However, canceling a credit or debit card can be inconvenient. Once the card is cancelled, the card owner must do without the card, and may not have access to the underlying account, until a new card is received. This could take several days or even longer. Furthermore, the card owner may have established future automatic and/or recurring charges to be made to the card number. Once a financial account card is cancelled, the old card number is no longer valid, and any such pre-established charges to the cancelled card number will be rejected. Thus, the card owner may have to contact various merchants or others to change the card number to be used when the new card and card number is received. All of these inconveniences are made more frustrating when the supposedly lost or stolen card is found by the card owner. Under current systems and practices, once the card is cancelled it cannot be reactivated. Thus, finding the lost card that has been cancelled may give the card owner some peace of mind, in knowing that the card was not in the wrong hands for any period of time, but otherwise is not very helpful. Since the old card number has been cancelled, and, under current practice, cannot be revived, the found card is of no value and can only be destroyed.

Even if a financial account card owner knows where their card is, even if the card is securely in their possession, there is some risk that an unscrupulous person will be able to use the card number to access the underlying financial account without permission. It is possible that such a person may obtain the card number in some illegitimate way, and some merchants or transactions may not require the use of additional security measures, such as the use of PIN's and the like, to process a card transaction using the card number. With some, a card transaction may be authorized if the person presenting the card can present basic information about the card or the legitimate card owner, such as the expiration date of the card and/or underlying account, or the legitimate card owner's mother's maiden name along with the card number, etc. Such information might be obtained from a variety of legitimate and illegitimate sources. Thus, a victim of identity theft is at risk of having their credit or debit card account accessed without their permission even if the credit or debit card is not lost or stolen.

What is desired, therefore, is an effective system and method whereby a card owner is able to lock or prevent use of a financial account card, such as a credit card or a debit card, as desired, and to reactivate or unlock the card, repeatedly as desired. Such a system and method, therefore, provides the card owner with the flexibility both to secure access to the underlying card account when desired, e.g., when the location of the card is uncertain, as well as to avoid the frustration and inconvenience of unnecessarily having had to cancel the card outright when the card is later found. Such a system and method also provides an additional degree of security in allowing a card owner to lock access to a card account during periods when the card is not in use by the card owner, even if the card location is known and secure, thereby to secure the account from unauthorized transactions during the locked periods by those who may obtain the card number and other card owner identifying information even though they do not possess the card itself.

SUMMARY OF THE INVENTION

The present invention provides a system and method for a financial account card owner to lock and unlock use of the card repeatedly as desired. The present invention may be applied to any financial account card such as a credit card, debit card, or the like. By locking the card, access to the underlying account by anyone using the locked card number is prevented from the time the lock is imposed. However, locking the card does not cancel the card number permanently. Rather, in accordance with a system and method and in accordance with the present invention, the card owner may, at a later time, unlock a locked card, thereby allowing access to the underlying account using the card number. In accordance with the present invention, the card owner may repeatedly lock and unlock the card any number of times as desired.

In accordance with the present invention, a financial account card owner is able to lock or unlock a card by providing a user request via an appropriate delivery channel to a card processor. The user request may be a request to lock an active or operable card, or to unlock a card that has previously been locked. The delivery channel for delivering the card owner request to the card processor may include, for example, a telephone, e.g., using a voice response unit (VRU), an automated teller machine (ATM), and/or a computer network interface, such as an online interface via an internet web site. The card owner request is forwarded via the selected delivery channel to a card processor implemented in a computer system that performs the requested card locking or unlocking operation. The card processor computer system may be operated by a bank, financial institution, or other entity that issues the financial account card to the card owner, and/or a third party card transaction processing service.

The card processing system preferably automatically authenticates the card number that is presented to the card processing system to be locked or unlocked. This may be accomplished by verifying that the card number corresponds to a personal identification number (PIN) and/or card verification value (CVV)/card verification code (CVC) that is required to be provided along with the card number by the card owner requesting the locking or unlocking action. If the card number is authenticated as belonging to the requesting card owner, the current activation status of the card is checked. If the card is currently active and operable and is to be locked, the current active status of the card is saved before locking the card to prevent use of the card number. If the card is to be unlocked, the saved previously active status of the card is restored. Changes to the activation status of the card may be provided to any companion systems that may require such card activation status information. An audit record of the requested card locking or unlocking action and the resulting change in the card activation status may be saved, and a response forwarded back from the card processor via the delivery channel to the card owner indicating that the requested card locking or unlocking operation request has been received and has been performed or, for example, if the card processor system could not authenticate the card owner, that the requested action has failed.

Further objects, features, and advantages of the present invention will be apparent from the following detailed description taken in conjunction with the accompanying drawings.

DETAILED DESCRIPTION OF THE INVENTION

Figure 1:
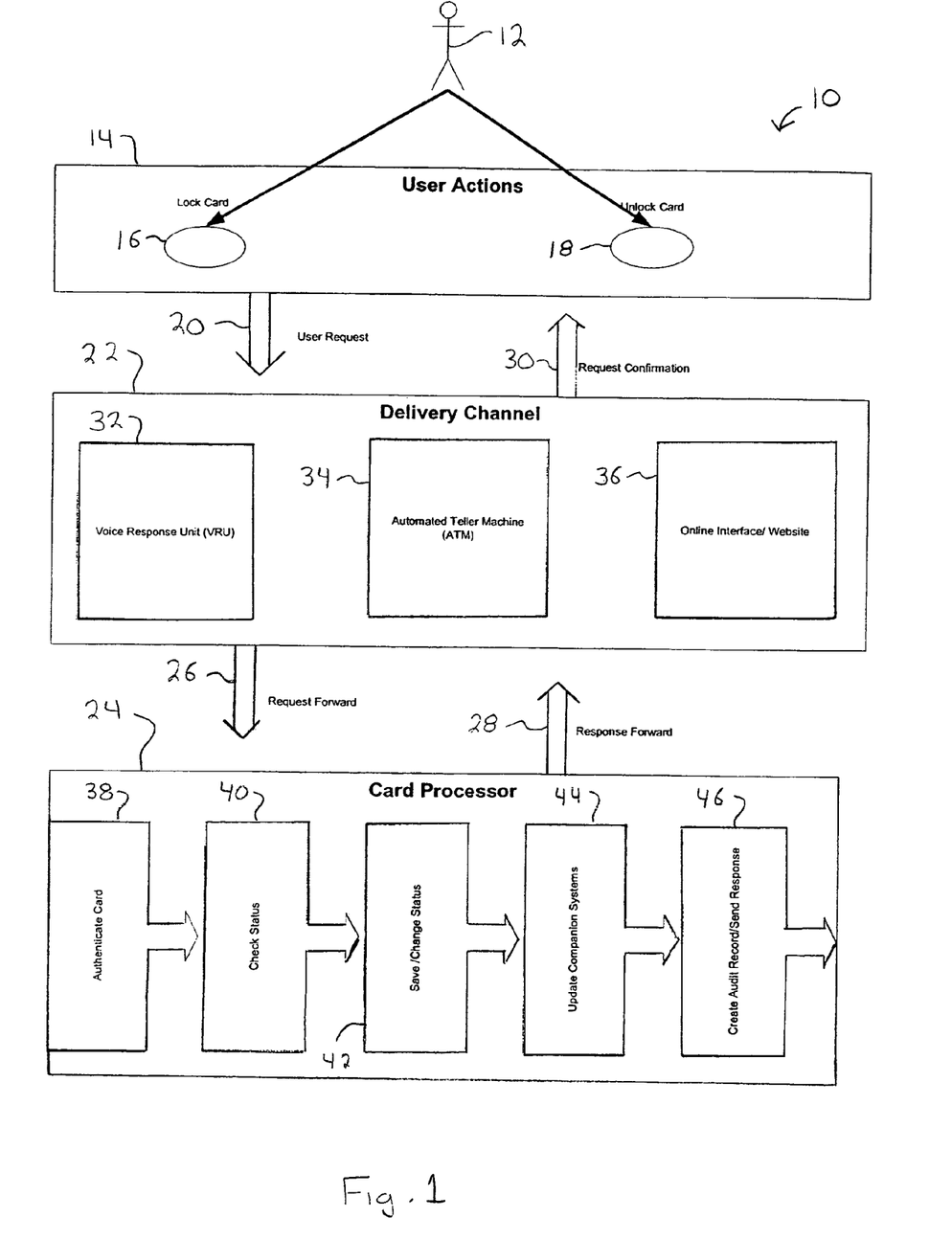
FIG. 1 is a block diagram illustrating in overview an exemplary system and method for locking and unlocking a financial account card in accordance with the present invention.

An exemplary system 10 and method for locking and unlocking a financial account card in accordance with the present invention will be described in detail herein first with reference to FIG. 1. Based on the detailed written description of the functionality of a system in accordance with the present invention, along with the detailed flow chart diagrams and other illustrations, presented herein, a person of ordinary skill in the art of computer programming for the processing of financial accounts will be able to implement a system and method for locking and unlocking a financial account card in accordance with the present invention on conventional and future computer based systems running conventional operating systems and using conventional programming language and techniques. For example, the present invention may be implemented as part of conventional present or future computer based systems for processing financial account cards and financial account card transactions.

The present invention may be applied to the locking and unlocking of any financial account card that may be owned by an individual or business card owner 12. For example, the present invention may be applied to credit cards, debit cards, or other account cards as issued by financial institutions and other card issuers. Such cards may provide access to underlying credit accounts, deposit accounts (such as checking and savings accounts), brokerage accounts, or any other type of financial account as may be held by a financial institution (bank, savings and loan, credit union), brokerage firm, retail or other business or any other entity.

In accordance with the present invention, a card owner 12 is able to perform alternatively two user actions 14 related to a financial account card. The card owner 12 may either lock the card 16, thereby preventing use of the card and preventing access to the underlying account using the card number, or unlock the card 18, thereby allowing use of the card and access to the underlying account using a previously locked card number.

The card owner 12 initiates a user action 14, either locking 16 or unlocking 18 a card, by providing a user request 20 via a delivery channel 22 to a card processor 24. As will be discussed in more detail below, a variety of different delivery channels 22 may be made available to the card owner 12. The delivery channels forward 26 a user request 20 for a user action 14, to lock 16 or unlock 18 a card, to the card processor 24. The card processor 24 may generate and forward a response 28 indicating that a user request has been received and whether or not the requested user action 14 has been implemented by the card processor 24. This response 28 is delivered via the selected delivery channel 22 as a user action request confirmation 30 to the card owner 12.

In accordance with the present invention, a variety of delivery channels 22 may provide a user interface for a card owner 12 to present a request to lock 16 or unlock 18 a financial account card to the card processor 24, wherein the locking or unlocking operation is implemented. Exemplary delivery channels 22 that may be employed in accordance with the present invention for this purpose include: a telephone system using a voice response unit (VRU) interface 32, an automated teller machine (ATM) 34 interface, and/or an online interface 36 via a computer network such as the internet. It should be understood that other similar or different current or future delivery channels may be employed in accordance with the present invention to provide a user interface between the card owner 12 and the card processor 24. Any such delivery channel 22 employed in accordance with the present invention preferably provides an electronic connection between the card owner 12 and the card processor 24. A delivery channel 22 requiring human intervention may be employed in accordance with the present invention. For example, the delivery channel 22 may include a human operator at a customer service center. In such case, the card owner 12 may call the customer service center and present the request to a live person that a financial account card be locked 16 or unlocked 18. The live operator may then respond to the card owner's 12 request by entering the request, along with appropriate card owner identification, as will be discussed in more detail below, into the card processor system 24 via an appropriate connection thereto, e.g., via a computer network.

A card owner 12 may provide a user action 14 request 20 to a card processor 24 via a VRU 32 delivery channel 22 by calling an appropriate telephone number provided to the card owner. Such a number preferably is provided to the card owner 12 along with other account information provided to the card owner 12 at the time that the card is issued, and preferably also may be printed on the card as well as provided on monthly account statements. A recorded and/or computer generated voice provided by the VRU 32 may prompt the card owner 12 to enter appropriate card identification information, such as the card number, and other confirming information, such as a personal identification number (PIN) and/or a card verification value (CVV) or card verification code (CVC). Such numerical information may be entered into the VRU 32 by the card owner 12 using the keys of a touch tone phone with which the card owner 12 is calling the VRU 32. Alternatively, a voice recognition unit implemented as part of the VRU 32 may be employed to allow the card owner 12 merely to speak the required information into the telephone. Similarly, the card owner 12 may be prompted to indicate the user action 14 being requested, i.e., either to lock 16 or unlock 18 the financial account card identified. The identification and user action information entered by the card owner 12 via the VRU 32 is then forwarded 26 to the card processor 24 for implementation, e.g., by an appropriate computer network connection. A response 28 confirming 30 that the user action request has been forwarded to the card processor 24, and either implemented or, for some reason, not implemented, may be provided to the card owner 12 via the VRU 32 with an appropriate recorded and/or computer generated voice message. Conventional current or future VRUs 32 or similar devices or systems may be used to implement the process just described.

The card owner 12 may present a request 20 to lock 16 or unlock 18 a financial account card to the card processor 24 via an ATM 34 by providing the card to be locked or unlocked to the ATM 34 in a conventional manner. The card number, and/or other identifying information, may be read automatically from the magnetic strip on the card using an appropriate card reader provided by the ATM 34. The card owner 12 may be prompted, via a printed message on an ATM display screen, to enter other identifying information, such as a PIN number and/or CVV/CVC code, using, e.g., a keypad or touch screen monitor provided on the ATM 34. The card owner 12 may also be prompted to indicate whether the owner 12 would like to lock 16 or unlock 18 the card, or to perform some other card transaction, such as to access the underlying account, to make a withdrawal, etc. The requested user action 14 is forwarded electronically, via an appropriate ATM network, to the card processor 24 for implementation. A response 28 from the card processor 24 may be presented as a request confirmation 30 to the card owner 12, indicating that the requested user action 14 has been received, and implemented, or not implemented for some reason, and displayed on the display screen of the ATM 34. Conventional known or future ATMs 34, and ATM networks, may be employed, with appropriate modification, to implement the functionality of a delivery channel 22 in accordance with the present invention as just described.

A card owner 12 may provide a request 20 to the card processor 24 in accordance with the present invention to lock 16 or unlock 18 a card via an online computer network interface 36 by accessing an appropriate website on the internet. The customer card owner 12 may access the online interface website 36 in a conventional manner using a personal computer, hand held wireless device, or similar device via a conventional wired or wireless connection to the internet, e.g., via an internet service provider or otherwise. A website providing such a user interface service to the card owner 12 may be provided by the card issuer, by the financial institution or other entity holding the underlying customer financial account, or by a third party provider of such a service. Various user friendly user interfaces and menus may be provided at the online interface website 36 to prompt a card owner 12 to enter the card number of the financial account card to be locked 16 or unlocked 18, to enter other appropriate identifying information, such as a PIN and/or CVV/CVC code, as well as to identify the user action 14 to be performed, e.g., to lock 16 or unlock 18 a financial account card. The identifying and other information provided by the card owner 12 via the online interface 36 is forwarded 26 to the card processor 24 via any appropriate computer network connection thereto. A response 28 from the card processor 24 may be provided to the card owner 12 and displayed via the online interface 36, confirming 30 that the user 12 request has been received and implemented, and/or not implemented for some reason. Alternatively or additionally, for example, the card owner 12 may receive the confirmation 30 in the form of an e-mail message that is delivered to an e-mail address provided by the card owner 12. Any conventional current or future online interface, website, or the like may be used to implement the online interface/website 36 delivery channel 22 functionality described herein.

The request from a financial account card owner 12 to lock 16 or unlock 18 a financial account card is forwarded via the delivery channel 22 selected, via appropriate connections, to the card processor 24 for implementation. The card processor 24 may be implemented in any appropriate current or future computer system. The processing capacity of the computer system used to implement the card processor 24 will depend upon the volume of user actions 14 to be processed, the speed at which it is desired for the system 10 to respond to a user action 14 request, as well as the specific implementation of a system and method for locking and unlocking a financial account card in accordance with the present invention as implemented in the card processor 24. Either a single computer or multiple computers networked together may be used to implement the card processor 24. The card processor 24 functionality to be described in detail herein preferably may be implemented in a computer system 24 operated by a financial account card processor along with other conventional functionality for processing financial account card transactions.

A method in accordance with the present invention for locking or unlocking a financial account card as implemented by a card processor 24 begins with receipt by the card processor 24 of a user request 26 to lock 16 or unlock 18 a card via a selected delivery channel 22. The received request 26 includes card identifying information, such as the card number and other identifying information. This information is used by the card processor 24 to authenticate 38, the card, i.e., to verify that the card number corresponds to a financial account card that may be processed by the card processor 24 and that the request to lock 16 or unlock 18 the card is being presented by the authorized card owner 12. The card processor 24 then checks the current status 40 of the card, to confirm whether the financial account card identified is currently operable, currently locked, or in some other activation state. The card processor 28 then changes 42 the activation state of the card as requested by the card owner 12, i.e., the card is locked or unlocked as requested. If the card is currently operable and is to be locked, the current operable state of the card is saved 42 for future use. Any companion systems may then be updated 44 by the card processor 24 with the changed card activation status. An audit record of the change implemented to the card activation status may then be saved 46, and a response 28 forwarded via the delivery channel 22 back to the card owner 12. The general process implemented by the card processor 24 as just described will now be described in more detail, specifically for card locking and unlocking operations.

Figure 2:
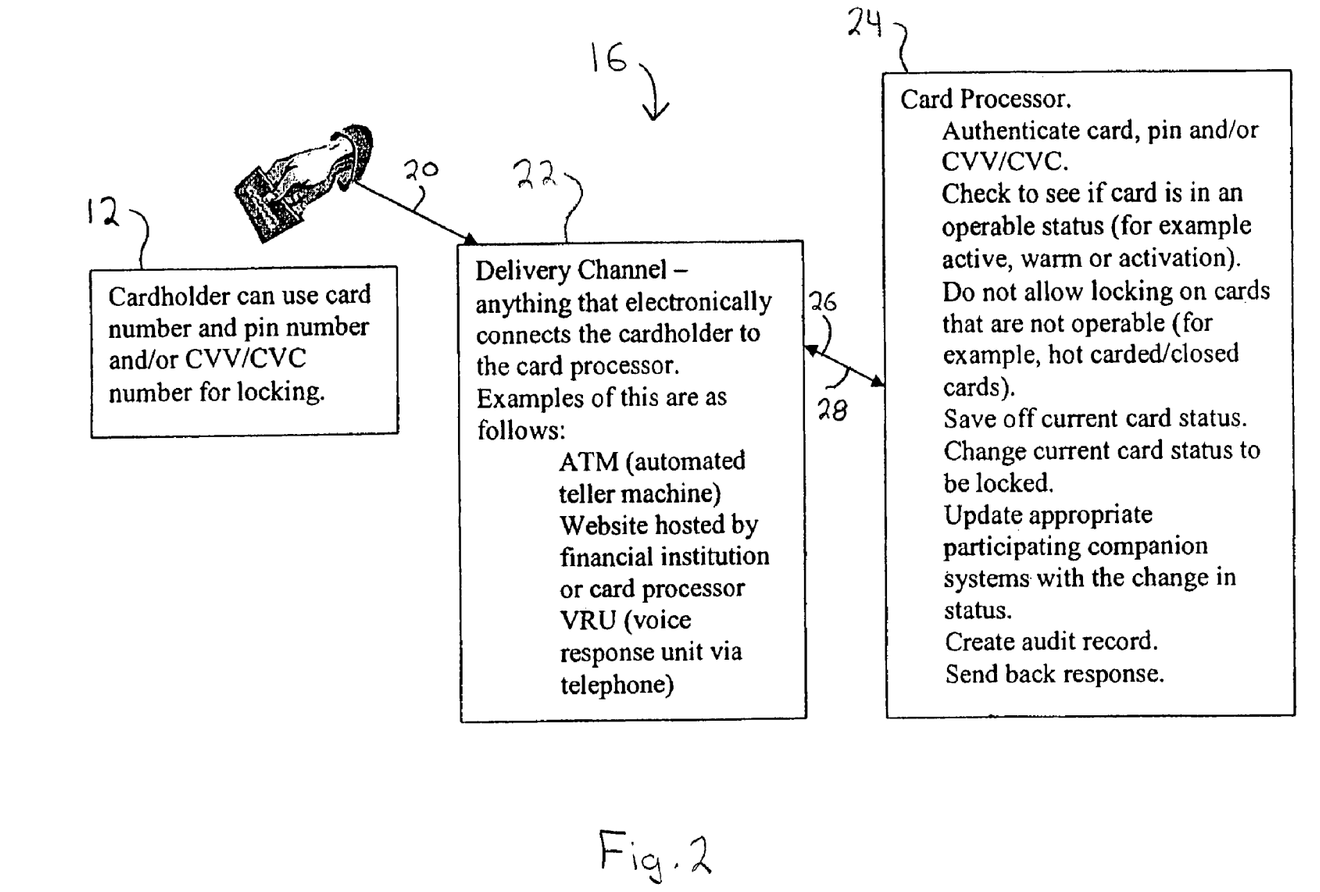
FIG. 2 is a simplified block diagram illustrating an exemplary method for using a system in accordance with the present invention for locking a financial account card.

A card locking 16 operation or transaction in accordance with the present invention is illustrated generally in overview in FIG. 2. The card owner 12 initiates the locking transaction 16 by providing the card number and other requested identification information, e.g., a PIN and/or CVV/CVC number, into an appropriate delivery channel 22, such as a VRU 32, ATM 34, or online interface 36. Similarly, the card holder 12 requests 20 that a card locking 16 operation be performed. This request 20, along with the card number and other identifying information, is forwarded 26 via the selected delivery channel 22 to the card processor 24 for implementation. A response 28 may be sent back from the card processor 24, via the selected delivery channel 22, to the card owner 12, to indicate that the card locking operation request has been received and has, or has not, been implemented.

Figure 3:
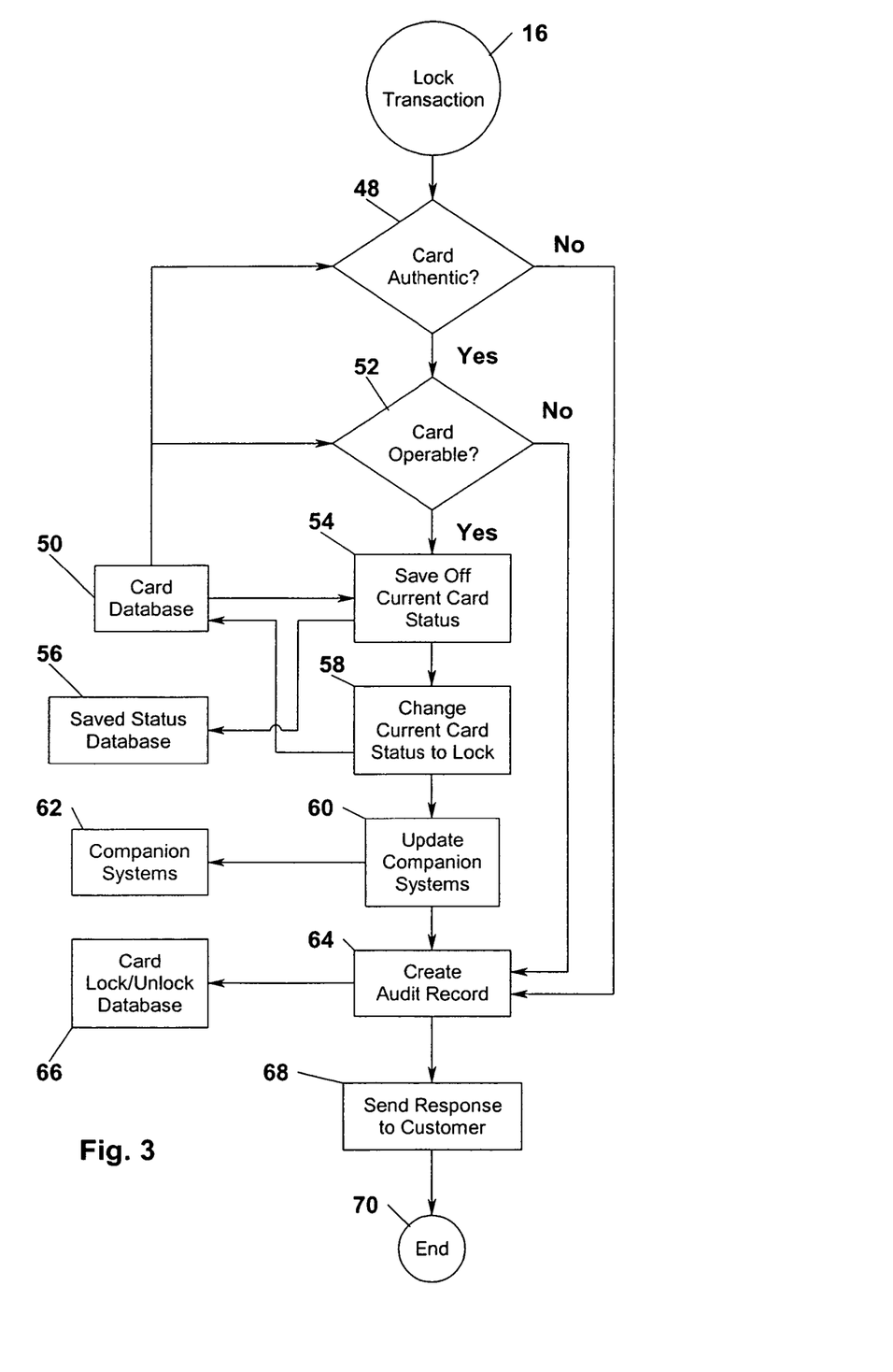
FIG. 3 is a more detailed flow chart diagram of an exemplary method for locking a financial account card in accordance with the present invention.

A flow chart diagram illustrating an exemplary card locking transaction 16 that may be implemented by a card processor 24 in accordance with the present invention is presented in FIG. 3, and will be described in detail with reference thereto. Using the card number and other identifying information provided, along with card information stored in a card database 50, the card processor verifies that the card is authentic 48. For example, as part of the authentication process 48 it may be determined whether or not the card number corresponds to a valid financial account card that may be processed by the card processor 24 as identified in the card database 50. The authentication process 48 may also verify that the identifying information (PIN and/or CVV/CVC) as provided correspond with the provided card number. This verifies that the locking transaction 16 is being requested by an authorized card owner 12. Other card authentication processes also may be performed. For example, if the lock transaction request 16 was received via a VRU 32 delivery channel 22, it may be determined whether the request came from a phone number associated with the card owner 12. Similarly, if the lock transaction request 16 was received via an online interface 36 delivery channel 22, it may be determined whether the request came from a computer associated with the card owner 12.

If the card presented to be locked is verified as authentic 48, the current activation status of the card is checked to verify that the card is operable 52. Various status flags or codes are associated with each card number and maintained in the card database 50. The current operable status of the card is determined by the condition of these various status codes or flags. The locking process will not be allowed to proceed if it is determined from the status codes in the card database 50 that the card in question is not in an operable status, e.g., status codes indicate that the card is "hot carded", closed, cancelled, already locked, etc.

If the card to be locked is determined 52 to be currently operable, the current operable status of the card from the card database 50 is saved 54. The saved card status may be saved in a separate database 56 and/or as part of the card database 50.

Having saved the current active status of the card 54, the activation status of the card may be changed to a locked status 58. This change in activation status is recorded in the card database 50. For example, the locked status of the card may be indicated by setting a status code or flag associated with the card number in the card database 50 to a condition indicating that the card is locked. Preferably a separate code or flag is employed to indicate the locked/unlocked status of the card. That is, the code or flag selected to be used for this purpose is not used for any other purpose, i.e., is not used to indicate any other card activation status.

Having changed the current status of the card to locked 58 in the card database 50, the changed card status may be used to update 60 any companion systems 62. A companion system 62 is any system, other than the card processor system 24 that houses the locked/unlocked status of a financial account card, that needs to or should know the status of the card. For example, the card processor 24 may be the main processor that is supposed to receive authorization requests for card transactions. However, in some cases, a companion system 62 in front of the card processor 24 may stand in for the card processor 24 and make the authorization decision without passing the request to the card processor 24. For example, if the card processor 24 is not responding to an authorization request, a companion system 62 may be authorized to perform the authorization based on pre-established criteria. Some financial account card issuers may want a companion system 62 to authorize transactions that are under a certain floor limit (such as $5) instead of going out to the main card processor 24 to perform the authorization. In such cases the current locked or unlocked status of the card as established by the card processor 24 should be made available to the companion system 62, because the companion system 62 should have available the latest status of the card in making authorization decisions. In other words, the companion system 62 must know the card status so that transactions are not authorized for locked cards. Thus, the locked condition of the card is distributed such that, when locked, use of the card to perform any transactions (other than an unlock transaction 18) is prevented. Communication between the card processor 24 and any companion systems 62 to perform such status updates 60 may employ any means of electrical communications between systems, such as a computer network.

An audit record 64 of the requested locking transaction 16 then may be saved in an appropriate database 66. The audit record created 64 may include such information as the card number, when the lock transaction 16 was requested, whether or not the lock transaction 16 was successfully implemented, etc. If the card was not appropriately authenticated 48 or found inoperable 52, and, therefore, the lock transaction 16 could not be implemented, this information also preferably may be stored in the audit record database 66. The audit record database 66 may be employed by an operator of the card processor system 24 to perform various statistical analyses, e.g., on who is requesting card locks, the number of card locking transactions 16 requested by each card owner 12, etc.

Finally, a response 68 may be generated and sent back to the customer card owner 12, via the selected delivery channel 22. The response sent 68 to the customer card owner 12 may confirm that the lock transaction 16 request has been received, whether or not the requested lock transaction 16 has been implemented, and, if not implemented, may indicate why the lock transaction 16 was not implemented (card not identified as authentic, card already locked, etc.). This ends 70 the card locking transaction 16.

Figure 4:
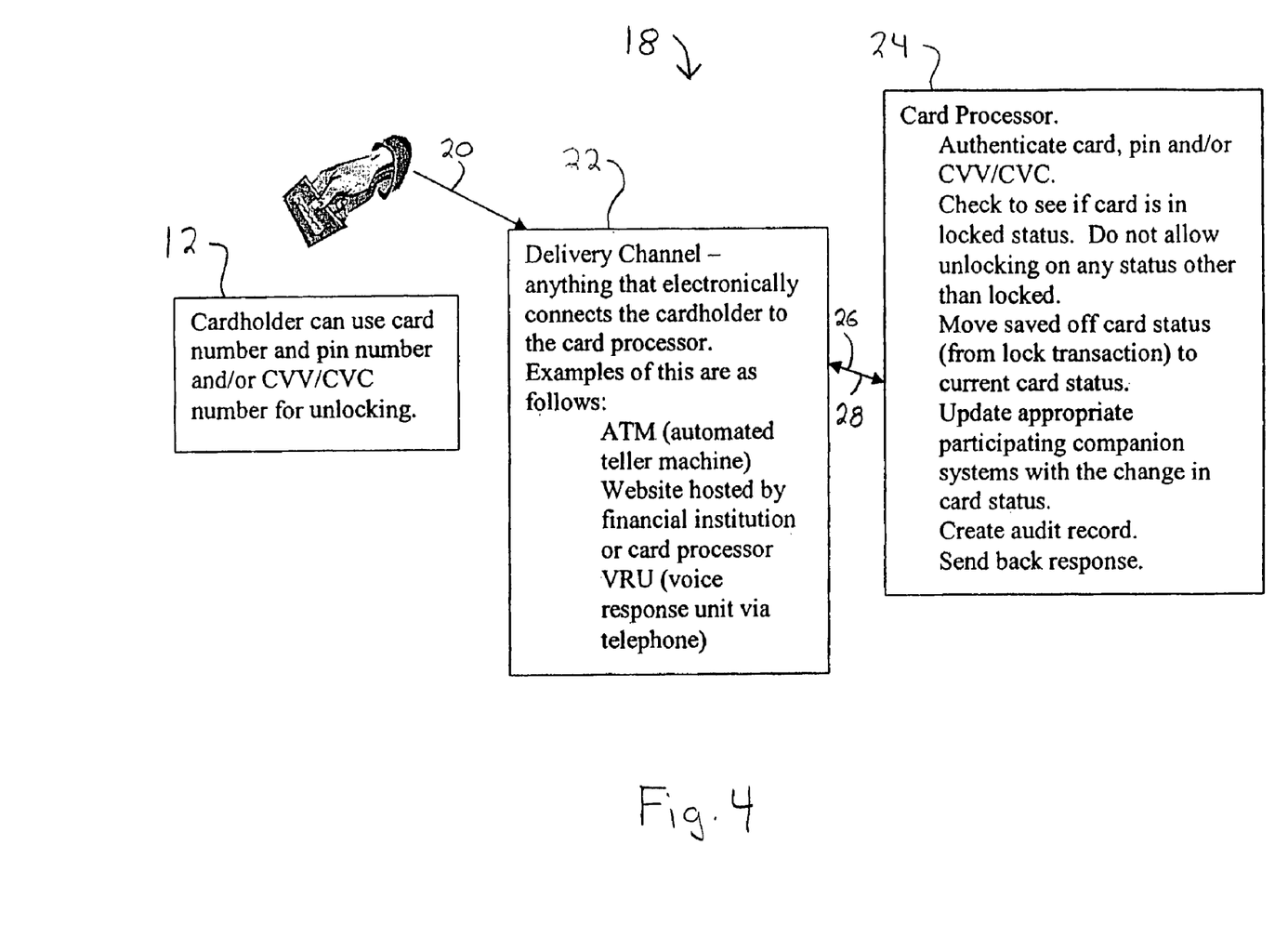
FIG. 4 is a simplified block diagram illustrating an exemplary method for using a system in accordance with the present invention for unlocking a financial account card.

An exemplary card unlocking transaction 18 as implemented by a system and method in accordance with the present invention now will be described in overview first with reference to FIG. 4. As with the card locking transaction 16, the card owner 12 initiates the card unlocking transaction 18 by providing the number of the financial account card to be unlocked and other requested identifying information, e.g., a PIN and/or CVV/CVC number, via a selected delivery channel, e.g., VRU 32, ATM 34, or online 36. In this case, however, the card owner 12 requests 20 that the card be unlocked 18. The card unlocking transaction request 20, along with the card number and other identifying information, is forwarded 26 via the selected delivery channel 22 to the card processor 24 for implementation. A response 28 may be sent back from the card processor 24, via the selected delivery channel 22, to the card owner 12, to indicate that the card unlocking operation request has been received and has, or has not, been implemented.

Figure 5:
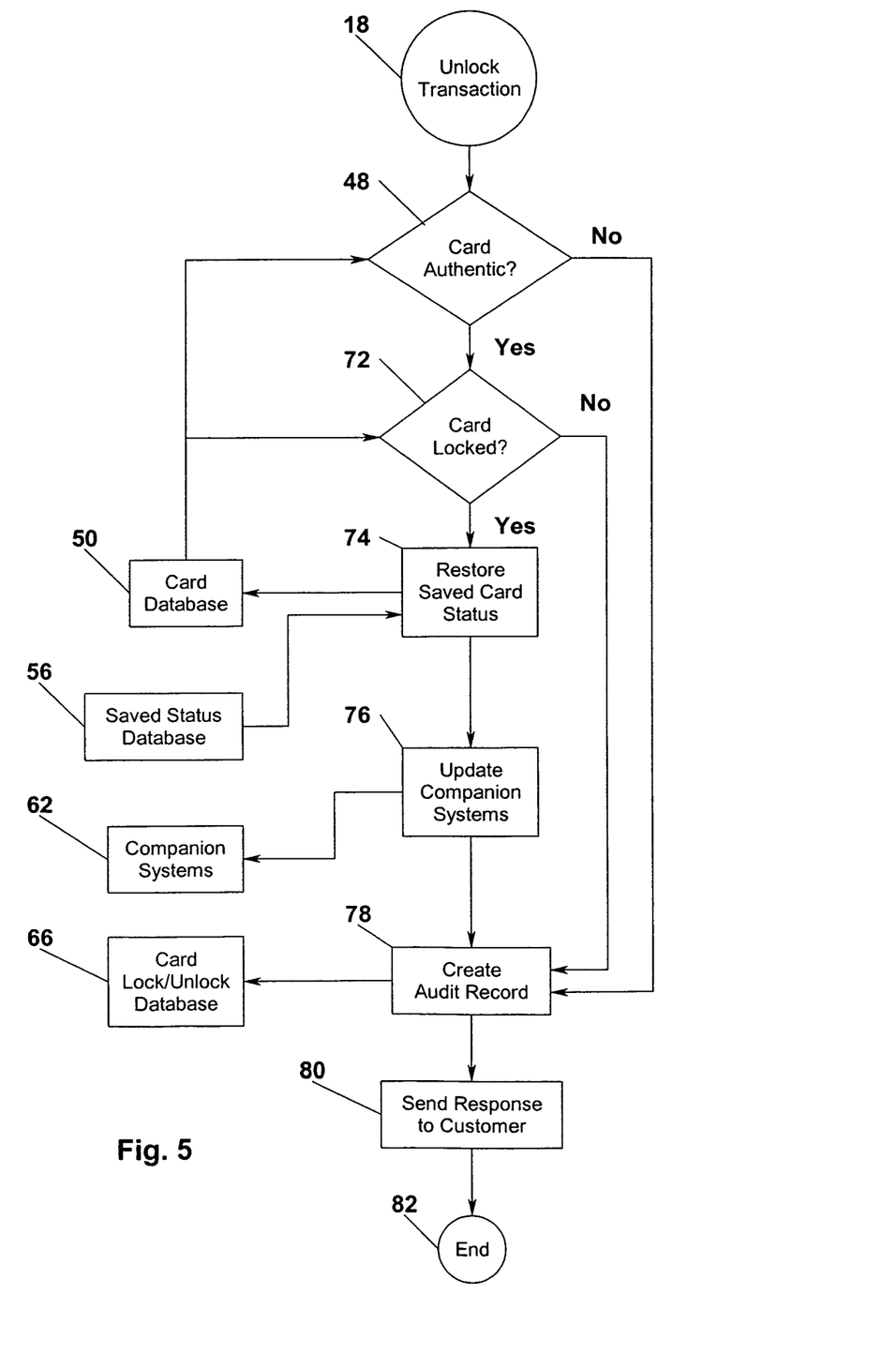
FIG. 5 is a more detailed flow chart diagram of an exemplary method for unlocking a financial account card in accordance with the present invention.

A flow chart diagram illustrating in detail an exemplary unlock transaction process 18, as may be implemented in a card processor 24 in accordance with the present invention, is presented in FIG. 5 and will be described with reference thereto. As with the lock transaction 16 described above, an initial step of the unlock transaction 18 is to authenticate 48 the card presented, e.g., to verify that the card is valid and is being presented for unlocking by an authorized card owner 12. The card authentication process 48 for the card unlocking transaction 18 may be the same as that described above for the card locking transaction 16.

If the card presented for unlocking is authenticated 48, a determination 72 is made to verify that the card is currently locked. This may be accomplished by checking the condition of the appropriate status code or flag for the card number presented as saved in the card database 50. The unlocking transaction 18 may only be allowed to proceed if the card status code or flag indicates that the card is currently locked.

If the card is determined 72 to be locked, the card may be unlocked 74 by returning the card to an active or operable status. This may be accomplished by changing the locked/unlocked status code or flag for the card to the unlocked state by retrieving the saved operable status of the card, as was saved at the time the card was locked, from the saved status database 56 and returning the activation status codes of the card in the card database 50 to the saved operable status.

Companion systems 62 may be updated 76 with the restored operable card status. Thus, the restored operable or unlocked status of the card is distributed such that the card may once again be used for other transactions by the card owner 12.

As with the card locking transaction 16, an audit record 78 of the card unlocking transaction 18 is saved in an appropriate database 66. The saved audit record preferably identifies both the card number of the card being unlocked as well as the time of the transaction, whether the card was unlocked, status to which the card was returned after being unlocked, and, if the card was not unlocked, a reason therefore (card not authenticated or card not locked at time of request to unlock).

A response 28 may then be generated and sent 80 to the card holder 12, via the selected delivery channel 22, indicating that the request to unlock the card has been received and implemented. Alternatively, if the request to unlock the card has not been implemented, an appropriate reason therefore (e.g., card not authenticated, card not locked at time of request, etc.) may be provided to the card owner 12 as part of the response message. The card unlocking transaction 18 is then ended 82.

In accordance with the present invention, card locking 16 and unlocking 18 transactions may be requested alternately repeating any number of times by a card owner 12. Thus, the card owner 12 is able to secure the card number from any unauthorized use whenever desired and then to return the card to an operable status as many times as desired.

It should be understood that the present invention is not limited to the particular exemplary applications, embodiments, and implementations illustrated and described herein, but embraces all such modified forms thereof as come within the scope of the following claims.

What is claimed is:

1. A system for locking and unlocking a financial account accessed by a card, comprising:
    a card processor implemented in a computer system, coupled to a delivery channel, and adapted to
    (a) receive card in information via the delivery channel, a request to perform a lock operation via the delivery channel to prevent the card from being used to access the account, and a request to perform an unlock operation via the delivery channel to allow the card to be used to access the account;
    (b) authenticate the card identifying information;
    (c) in response to a request to perform a lock operation to
        (i) verify that the card to have its use locked currently has an operable; status wherein it may be used to access the account;
        (ii) save the operable status of the card;
        (iii) lock the use of the card by changing the current status of the card to a locked status whereby use of the card to access the account is prevented;
    (d) in response to a request to perform an unlock operation to
        (iv) verify that the card to have its use unlocked currently has a locked status wherein it may not used to access the account;
        (v) retrieve the saved operable status of the card;
        (vi) unlock the use of the card by changing the current status of the card to the retrieved saved operable status of the card whereby use of the card to access the account is allowed; and
    (e) send a response message via the delivery channel indicating that the request to perform a lock operation or the request to perform an unlock operation has been received.

2. The system of claim 1 wherein the card processor is coupled to a delivery channel selected from the group of delivery channels consisting of a voice response unit (VRU), an automated teller machine (ATM), and a computer network online interface.

3. The system of claim 1 wherein the card processor is adapted to receive card identifying information including a card number and other identifying information.

4. The system of claim 3 wherein the other identifying information is selected from the group of identifying information consisting of a personal identification number (PIN), a card verification value (CVV), and a card verification code (CVC).

5. The system of claim 3 wherein the card processor is adapted to authenticate the card identifying information by verifying that the received card number corresponds to the received other identifying information.

6. The system of claim 1 wherein the card processor is adapted to receive card identifying information identifying a financial account card selected from the group of financial account cards consisting of credit cards and debit cards.

7. The system of claim 1 wherein the card processor is adapted to use of the lock the card by setting a locked/unlocked status code associated with the card number to a locked status and wherein the locked/unlocked status code is used only to indicate whether the use of the card is locked or unlocked.

8. The system of claim 7 wherein the card processor is adapted to unlock the use of the card by setting the locked/unlocked status code to an unlocked status.

9. The system of claim 1 wherein the card processor is adapted to send a message to at least one companion system informing the at least one companion system that the card has had its use locked or unlocked.

10. The system of claim 1 wherein the card processor is adapted to save an audit record of a requested lock operation and of a requested unlock operation.

11. The method of claim 1 wherein when a lock operation has been performed, an account number associated with the card also may not be used to access the account, and when an unlock operation has been performed, an account number associated with the card also may be used to access the account.

12. A method implemented in a computer system of locking and unlocking a financial account accessed by a card, comprising:
    (a) receiving card identifying information and a request to perform a lock operation to prevent the card from being used to access the account or a request to perform an unlock operation to allow the card to be used to access the account via a delivery channel;
    (b) authenticating the card identifying information;
    (c) in response to a request to perform a lock operation
        (i) verifying that the card to have its use locked currently has an operable; status wherein it may be used to access the account;
        (ii) saving the operable status of the card;
        (iii) locking the use of the card by changing the current status of the card to a locked status whereby use of the card to access the account is prevented;
    (d) in response to a request to perform an unlock operation
        (iv) verifying that the card to have its use unlocked currently has a locked status wherein it may not be used to access the account;
        (v) retrieving the saved operable status of the card;
        (vi) unlocking the use of the card by changing the current status of the card to the retrieved saved operable status of the card whereby use of the card to access the account is allowed; and
    (e) sending a response message via the delivery channel indicating that the request to perform a lock operation or the request to perform an unlock operation has been received.

13. The method of claim 12 wherein the delivery channel is selected from the group of delivery channels consisting of a voice response unit (VRU), an automated teller machine (ATM), and a computer network online interface.

14. The method of claim 12 wherein the card identifying information includes a card number and other identifying information.

15. The method of claim 14 wherein the other identifying information is selected from the group of identifying information consisting of a personal identification number (PIN), a card verification value (CVV), and a card verification code (CVC).

16. The method of claim 14 wherein authenticating the card identifying information includes verifying that the received card number corresponds to the received other identifying information.

17. The method of claim 12 wherein the card identifying information identifies a financial account card selected from the group of financial account cards consisting of credit cards and debit cards.

18. The method of claim 12 wherein locking the use of the card includes setting a locked/unlocked status code associated with the card number to a locked status and wherein the locked/unlocked status code is used only to indicate whether the use of the card is locked or unlocked.

19. The method of claim 18 wherein unlocking the use of the card includes setting the locked/unlocked status code to an unlocked status.

20. The method of claim 12 comprising additionally sending a message to at least one companion system informing the at least one companion system that the use of the card has been locked or unlocked.

21. The method of claim 12 comprising additionally saving in a database an audit record of a requested lock operation and of a requested unlock operation.

22. The method of claim 12 wherein when a lock operation has been performed, an account number associated with the card also may not be used to access the account, and when an unlock operation has been performed, an account number associated with the card also may be used to access the account.

23. A method of locking and unlocking a financial account accessed by a card, comprising:
(a) providing a card processor implemented in a computer system, coupled to a delivery channel, and adapted to receive card identifying information via the delivery channel, a request to perform a lock operation via the delivery channel to prevent the card from being used to access the account, and a request to perform an unlock operation via the delivery channel to allow the card to be used to access the account, wherein the card processor authenticates the card identifying information; and wherein, in response to a request to perform a lock operation, the card processor
(i) verifies that the card to have its use locked currently has an operable; status wherein it may be used to access the account;
(ii) saves the operable status of the card;
(iii) locks the use of the card by changing the current status of the card to a locked status whereby use of the card to access the account is prevented; and wherein, in response to a request to perform an unlock operation, the card processor
(iv) verifies that the card to have its use unlocked currently has a locked status wherein it may not be used to access the account;
(v) retrieves the saved operable status of the card;
(vi) unlocks the use of the card by changing the current status of the card to the retrieved saved operable status of the card whereby use of the card to access the account is allowed;

(b) requesting via a delivery channel that a lock operation be performed by the card processor for an account associated with a particular identified card;
(c) requesting via a delivery channel that an unlock operation be performed by the card processor for an account associated with the particular identified card; and
(d) making the requests of (b) and (c) in sequence repeatedly a plurality of times.

24. The method of claim 23 wherein the card processor is coupled to a plurality of different delivery channels and wherein requesting that a lock operation be performed and requesting that an unlock operation be performed are made via different delivery channels.

25. The method of claim 23 wherein when a lock operation has been performed, an account number associated with the card also may not be used to access the account, and when an unlock operation has been performed, an account number associated with the card also may be used to access the account.

* * * * *

UNITED STATES PATENT AND TRADEMARK OFFICE
CERTIFICATE OF CORRECTION

PATENT NO. : 7,383,988 B2  
APPLICATION NO. : 11/217018  
DATED : June 10, 2008  
INVENTOR(S) : David B. Slonecker, Jr.

Page 1 of 1

It is certified that error appears in the above-identified patent and that said Letters Patent is hereby corrected as shown below:

Claim 1, col. 11, line 29, "receive card in information" should read --receive card identifying information--.

Claim 1, col. 11, line 38, delete ";" after "operable".

Claim 1, col. 11, line 47, "may not used" should read --may not be used--.

Claim 7, col. 12, line 13, "adapted to use of the lock the card" should read --adapted to lock the card--.

Signed and Sealed this
Fifteenth Day of February, 2011

David J. Kappos
*Director of the United States Patent and Trademark Office*